United States Patent [19]

Murakami

[11] Patent Number: 4,614,991
[45] Date of Patent: Sep. 30, 1986

[54] CASSETTE TAPE RECORDING AND/OR REPRODUCING APPARATUS

[75] Inventor: Atsushi Murakami, Tokyo, Japan

[73] Assignee: Sony Corporation, Tokyo, Japan

[21] Appl. No.: 739,434

[22] Filed: May 30, 1985

[30] Foreign Application Priority Data

Jun. 1, 1984 [JP] Japan .................................. 59-81785

[51] Int. Cl.⁴ ............................................ G11B 5/008
[52] U.S. Cl. ................................... 360/137; 360/96.5; 360/96.6; 242/200
[58] Field of Search ............... 242/199, 200; 360/96.5, 360/96.6, 137

[56] References Cited

U.S. PATENT DOCUMENTS

| | | | |
|---|---|---|---|
| 4,202,021 | 5/1980 | Nagase et al. | 360/96.5 |
| 4,344,096 | 8/1982 | Tanaka et al. | 360/96.5 |
| 4,493,417 | 1/1985 | Ackeret | 360/96.5 |
| 4,539,610 | 9/1985 | Takai | 360/96.5 |

FOREIGN PATENT DOCUMENTS 0188355 11/1983 Japan ................................. 360/96.5

*Primary Examiner*—A. Michael Chambers
*Attorney, Agent, or Firm*—Hill, Van Santen, Steadman & Simpson

[57] ABSTRACT

The body of a cassette tape recording and/or reproducing apparatus in which a cassette is mounted and a tape therein is driven for recording and/or reproducing, comprises a primary portion and a secondary portion slidably combined with the former, and an openable and closable cover which covers the cassette mounted in the body is also slidable with the secondary portion of the body. When the apparatus is out of use, the widths of the body and cover are decreased to smaller widths than those necessitated for mounting the cassette, and that the cover is prevented from opening, and only when the apparatus is in use, the widths of the body and cover are increased to minimal widths necessitated for mounting the cassette and that the cover is openable and closable.

4 Claims, 11 Drawing Figures

CASSETTE TAPE RECORDING AND/OR REPRODUCING APPARATUS

BACKGROUND OF THE INVENTION

1. Field of the Invention

This invention relates generally to a cassette tape recording and/or reproducing apparatus best suited for a compact tape cassette, particularly to such a cassette tape recording and/or reproducing appratus, wherein not only its body in which a tape cassette is mounted, but also its openable cover which covers the tape cassette mounted in the body, can be varied together in widths, and when the apparatus is in use, the widths of the body and cover are increased to minimal widths necessitated for mounting a cassette, and when the apparatus is out of use, the widths of the body and cover are so decreased to smaller widths than those necessitated for mounting the cassette as to be easier to carry.

2. Description of the Prior Art

In a cassette tape recording and/or reproducing apparatus of this sort, if the widths of the body and cover can be increased or decreased independently to each other, often occur such erroueous operations as to mount the tape cassette while the width of the body is decreased, or to decrease the width of the body while the tape cassette is mounted, so that the tape cassette or the apparatus is apt to be considerably damaged.

OBJECTS AND SUMMARY OF THE INVENTION

Accordingly, it is an object of the present invention to provide a cassette tape recording and/or reproducing apparatus in which a cover can not be opened or closed unless the width of the body of the apparatus is increased, and further, the width of the body can not be decreased during the opening or closing operation of the cover, or during the cover opened.

Another object of this invention is to provide a cassette tape recording and/or reproducing apparatus in which is never performed an erroneous operation such as a cassette is mounted while the width of the body of the apparatus is decreased, or the width of the body is decreased during the mounting operation of the tape cassette, so that the apparatus becomes very easy to use.

A further object of this invention is to provide a cassette tape recording and/or reproducing apparatus in which is never entertained a fear such as a tape cassette is forcibly mounted while the width of the body of the apparatus is decreased, or the width of the body is forcibly decreased during the mounting operation of the cassette, so that the cassette or apparatus is damaged considerably.

DETAILED DESCRIPTION OF A PREFERRED EMBODIMENT

Figure 1:
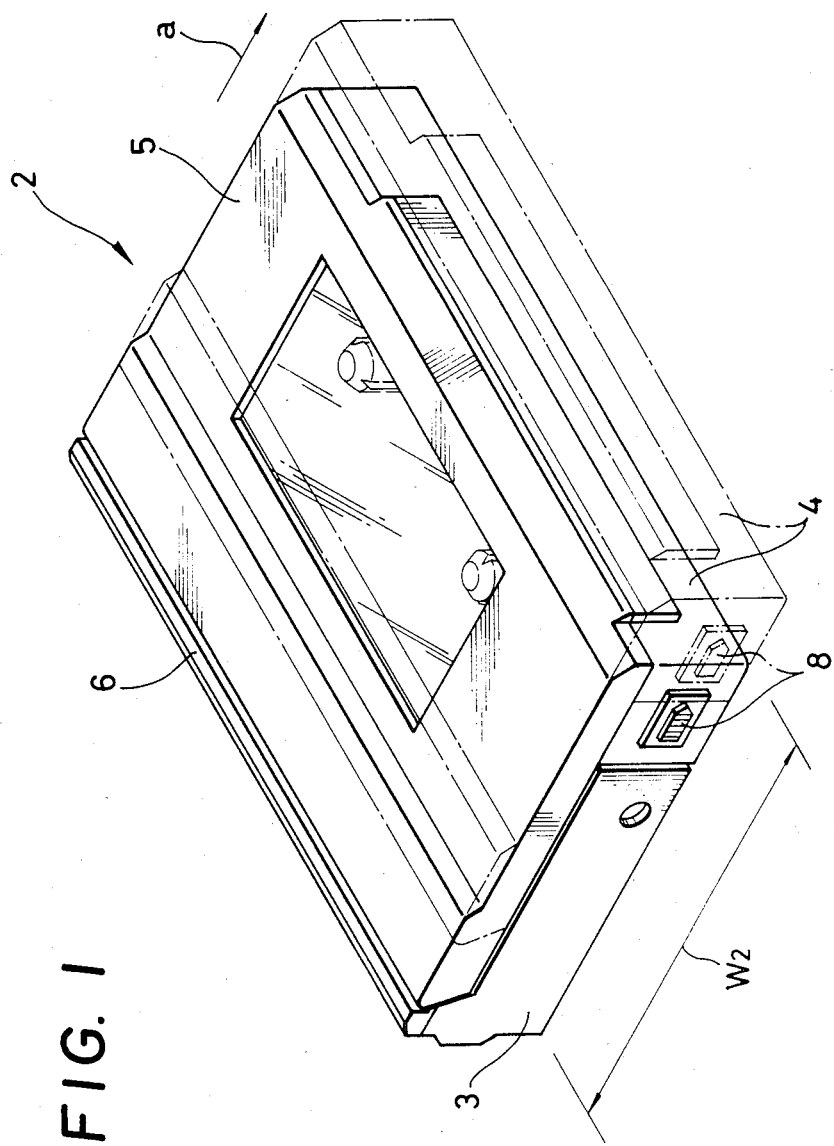
FIGS. 1 to 3 are perspective views for explaining the way of handling of a cassette tape recording and/or reproducing apparatus accoridng to an embodiment of this invention.

Referring to the drawings in detail, and initially to FIGS. 1 to 3, the way of handling of a cassette tape recorder according to an embodiment of this invention will be described.

The body 2 of the cassette tape recorder in which a tape cassette 1 is mounted comprises a primary portion 3 of the body 2 and a secondary portion 4 of the body 2 which are slidably combined with each other so that the width of the body may be increased or-decreased as desired.

A cover 5 which covers the tape cassette 1 and is mounted swingably on the body 2 is combined with the primary portion 3 of the body 2 through a support member 6 and can be varied in width. On the inside of the cover 5, there is arranged a cassette holder 7 which is also combined swingably with the primary portion 3 of the body 2 together with the support member 6.

Figure 3:
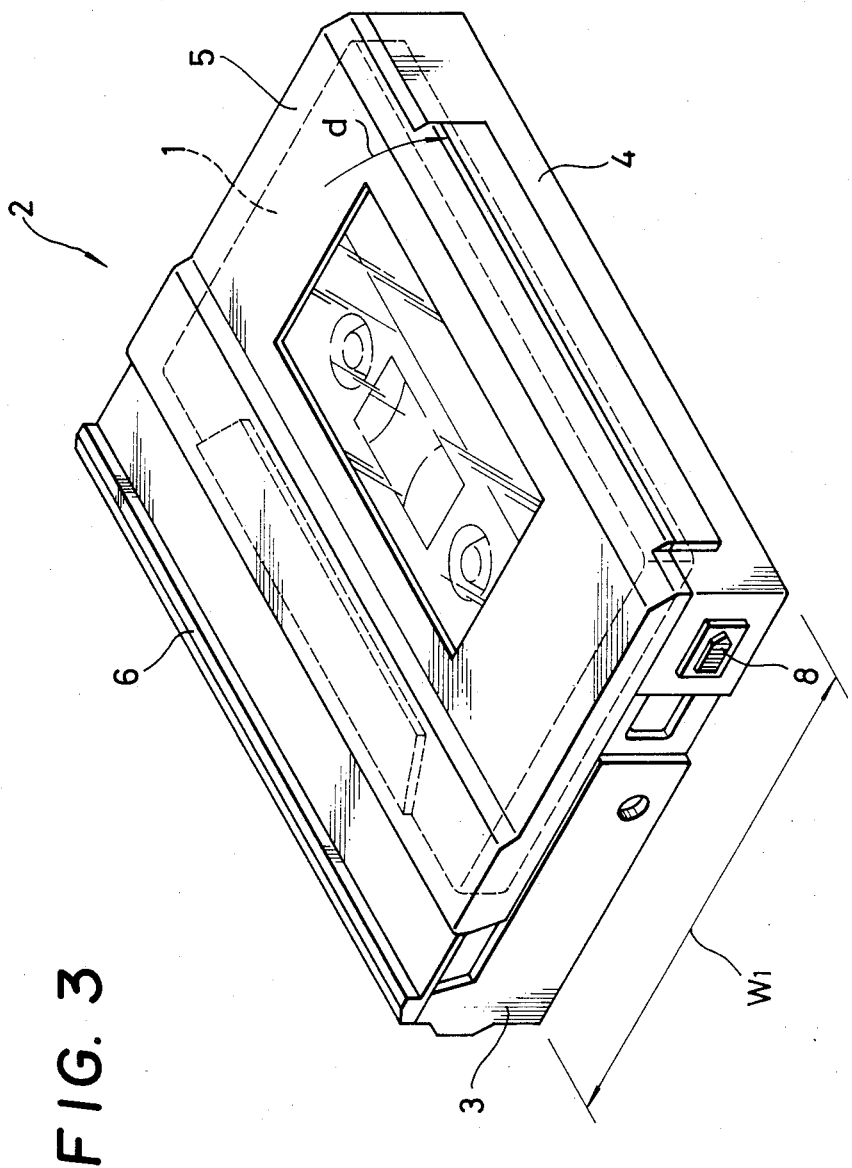

In FIG. 3 which shows the cassette tape recorder in use, the widths of both body 2 and cover 5 are to be increased to width $W_1$; a minimal width necessitated for mounting the cassette 1, and in FIG. 1 which shows the cassette tape recorder out of use, the widths of both body 2 and cover 5 are to be decreased to width $W_2$; a smaller width than that necessitated for mounting the cassette 1.

When the recorder is in use, the secondary portion 4 of the body 2 is slid in direction of arrow a against the primary portion 3 of the body 2 as indicated in chain-dotted lines in FIG. 1, so that the width of the body 2 is increased from width $W_2$ to width $W_1$. On this occasion, the cover 5 is also slid in direction of arrow a together with the secondary portion 4 of the body 2 as kept in the closed state.

Figure 2:
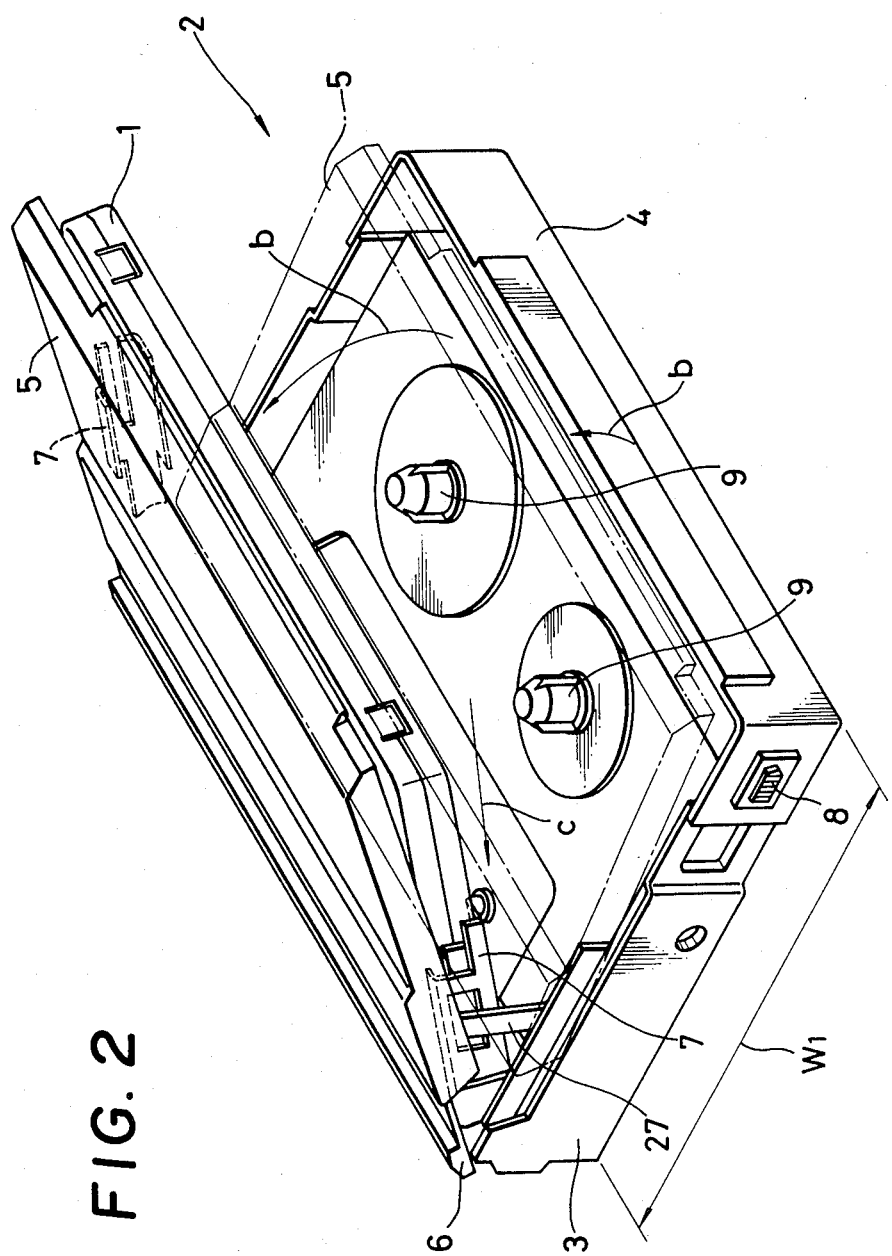

When a unlocking button 8 arranged at a side of the secondary portion 4 of the body 2 is pushed, the cover 5 pops up in direction of arrow b to the position indicated in chain-dotted lines in FIG. 2. In sucession, if the cover 5 is swung in direction of arrow b with the finger, the cover 5 is opened as indicated in solid lines in FIG. 2. On this occasion, the cassette holder 7 follows the cover 5 and is also swung in direction of arrow b. The pop-up action of the cover 5 is performed through a spring (not shown) sandwiched between the cover 5 and cassette holder 7, and the cover 5 is kept in the opened position by means of a toggle mechanism.

As shown in FIG. 2, the cassette 1 is inserted in direction of arrow c from the above into the cassette holder 7 which is arranged on the inside of the cover 5.

Next, when the cover 5 is swung to the closed position in direction of arrow d in FIG. 3 with the finger, the cassette 1 and cassette holder 7 are also swung in the same direction, so that the cassette 1 is mounted horizontally on a cassette mounting position of the body 2 as indicated in dotted lines in FIG. 3.

The cassette tape recorder has a pair of right and left reel bases 9 shown in FIG. 2 and a capstan (not shown), within the cassette mounting position of the body 2 like the conventional cassette tape recorder, so that the cassette 1 horizontally mounted is engaged with the pair of reel bases 9, the capstan, etc. as before, and the closed cover 5 is locked with a locking click mentioned later.

The above cassette tape recorder is used for reproducing only, so that a playback head, a pinch roller, etc. (not shown) are arranged in the cassette holder 7, and the playback head and pinch roller are inserted shallowly into the cassette 1 when the cassette 1 is inserted into the cassette holder 7 as shown in FIG. 2. And at the time when a playback button is pushed under a state wherein the cassette 1 is mounted and the cover 5 is closed, the playback head and pinch roller are deeply inserted into the cassette 1, so that the playback head comes in contact under a predetermined pressure with the magnetic tape (not shown) within the cassette 1, and the pinch roller is pressed against the capstan so as to perform a desired reproduction on the cassette 1.

Next, the constitution of this cassette tape recorder will be hereinafter described in detail on referring to FIGS. 4 to 9.

Figure 7:
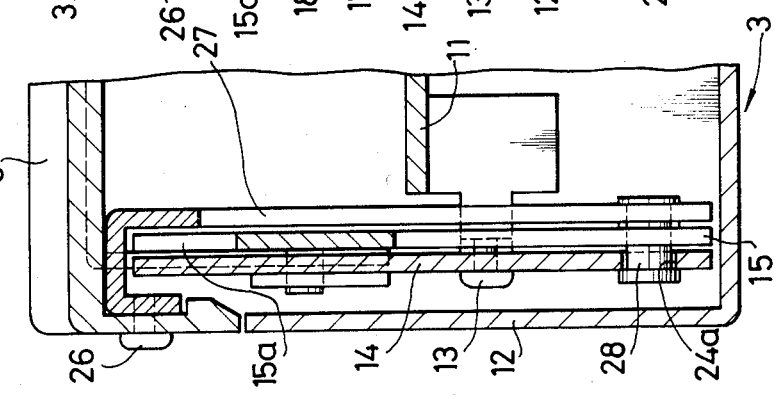
FIG. 7 is an enlarged sectional view taken along line VII—VII on FIG. 5A.

The primary portion 3 of the body 2 comprises a main chassis 11, a primary case 12 secured to the periphery of the main chassis 11 with screws and a guide plate 14 which is secured vertically to one side of the main chassis 11 with screws 13 within the primary case 12 as illustrated in FIGS. 5 and 7.

Figure 8:
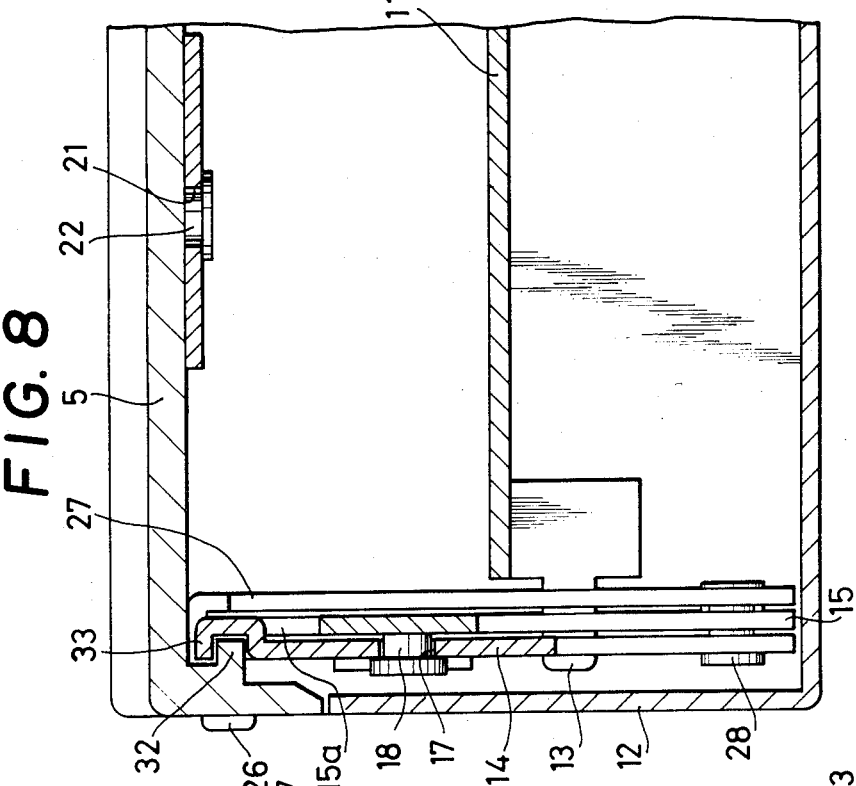
FIG. 8 is an enlarged sectional view taken along the line VIII—VIII on FIG. 5A.

The secondary portion 4 of the body 2 comprises a slidable chassis 15 combined slidably with the main chassis 11 and a secondary case 16 secured to the periphery of the slidable chassis 15 with screws. In order to make the drawings simple, there is illustrated a constitution that a guide pin 18 secured to the slidable chassis 15 is guided by a elongated hole 17 arranged in the guide plate 14 as shown in FIGS. 5 and 8.

As shown in FIG. 5, the support member 6 is attached rotataly to the guide plate 14 and main chassis 11 through a pair of right and left pivots 20, and also the cassette holder 7 is swung on these pivots 20. Further, the cover 5 is attached to the support member 6 through elongated holes 21 and guide pins 22, and slidable against this support member 6 as shown in FIGS. 5, 6 and 8.

In the guide plate 14, there is provided a L-shaped guide groove 24 having a linear part 24 parallel to the sliding direction of the slidable chassis 15 and a circularly curved part 24b whose centre the pivot 20 forms, as shown in FIGS. 5 and 7. A support member 27 secured at its upper end to the cover 5 with screws 26 is projected along the inside of the guide plate 14, and a sliding block 28 attached to the lower end of the support member 27 is slidably fitted in the guide groove 24.

Further, a guide piece 15a which extends almost vertically from one end of the slidable chassis 15 is inserted between the guide plate 14 and support member 27, and a sliding block 29 secured to the lower end of the guide piece 15a is slidably fitted in the guide groove 24 in a position nearer to the pivot 20 than that of the sliding block 28. The sliding block 29 is protruded from a small projection 30 formed integrally with the guide piece 15a.

As shown in FIG. 6, the guide piece 15a has a circularly curved edge 31 which is exactly the same in configuration as the curved part 24a of the guide groove 24, and the sliding block 28 is sandwhiched between this curved edge 31 and small projeciton 30. On this occasion, the contact surface of the sliding block 28 with the curved edge 31 becomes the rear part of the sliding block 28 with respect to the pivot 20.

Next, the width changing movements of the body 2 and cover 5, and the opening and closing movement of the cover 5 will be described hereinafter.

Figure 5A:
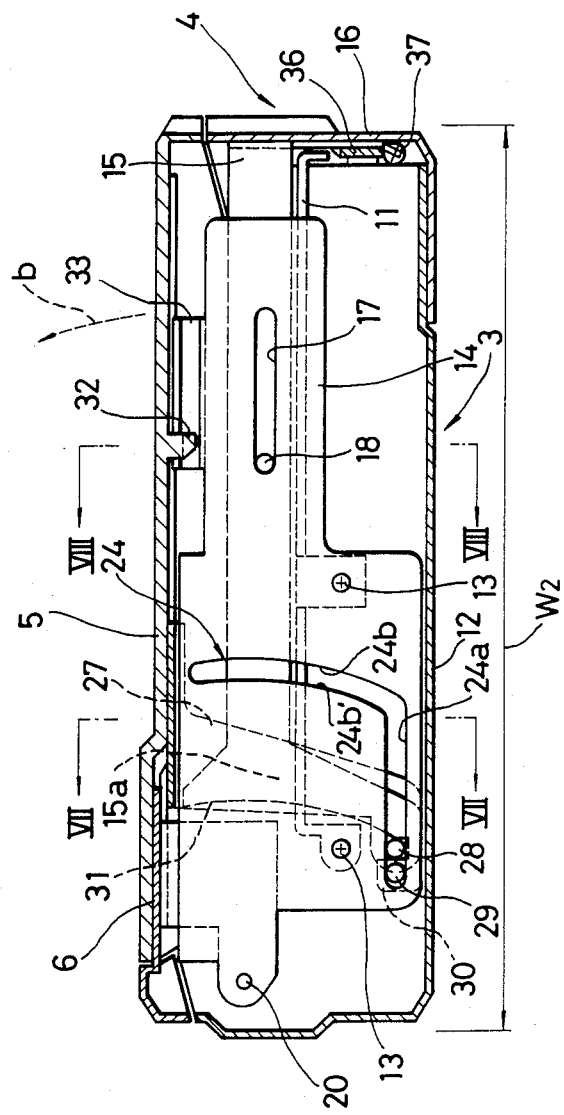
FIGS. 5A and 5B are sectional views taken along the line V—V on FIG. 4.
Figure 5B:
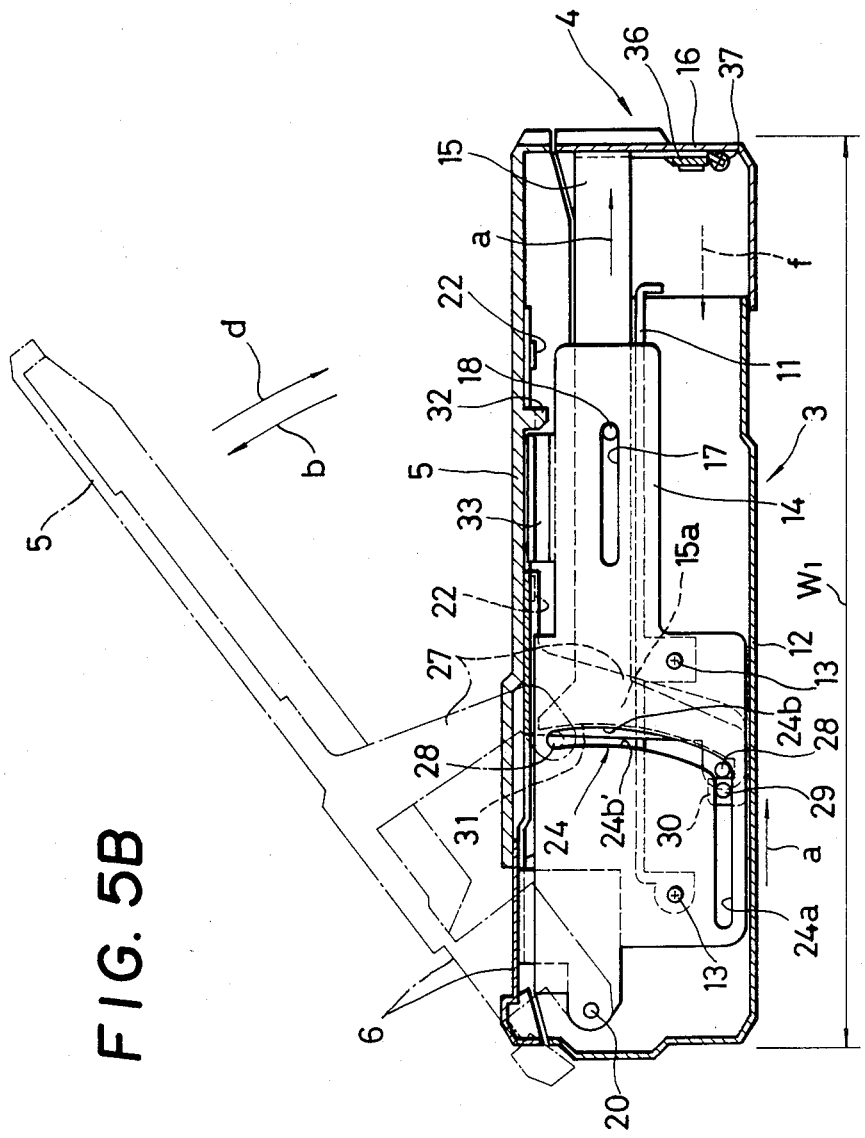
Figure 6A:
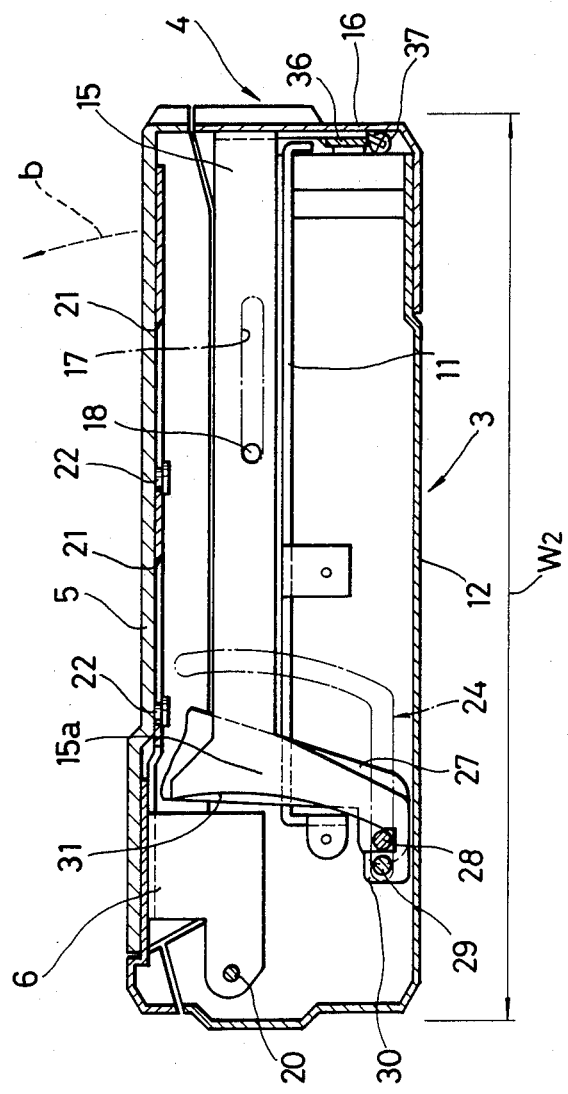
FIGS. 6A and 6B are sectional views taken along the line VI—VI on FIG. 4.

When the widths of the body 2 and cover 5 are decreased to width $W_2$ as indcated in solid lines in FIG. 1, the sliding blocks 28 and 29 are located at one end of the linear part 24a of the guide groove 24 as shown in FIGS. 5A and 6A. Therefore, the cover 5 can not be swung to open in direction of arrow b in FIG. 5A, because the cover 5 is held in the closed state owing to the linear part 24a of the guide groove 24. In addition, as a pawl 32 which is formed integrally with the cover 5 in a position far apart from the pivot 20 is fitted in a guide groove 33 which is formed integrally with the guide plate 14 in a position near to its upper edge, as shown in FIGS. 5 and 8, the pawl 32 and guide groove 33 prevent the cover 5 from opening, even though the cover 5 is to be opened forcibly in direction of arrow b in FIG. 5A.

Figure 4:
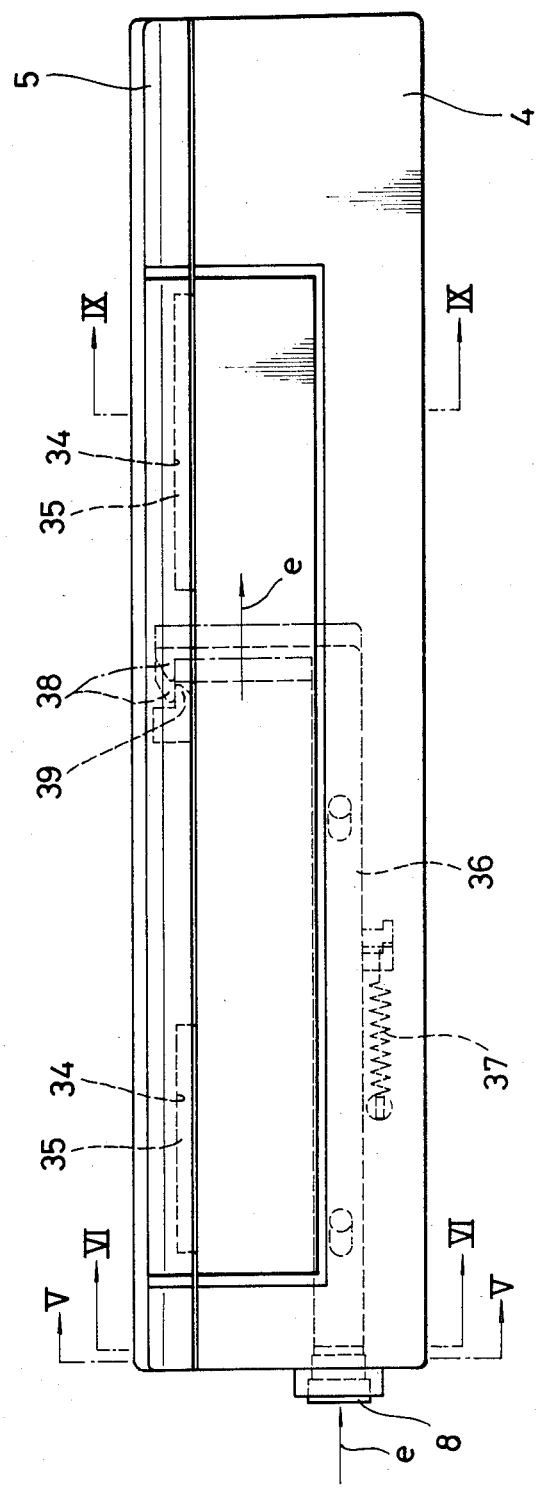
FIGS. 4 is a front view for illustrating the cassette tape recording and/or reproducing apparatus in detail.
Figure 6B:
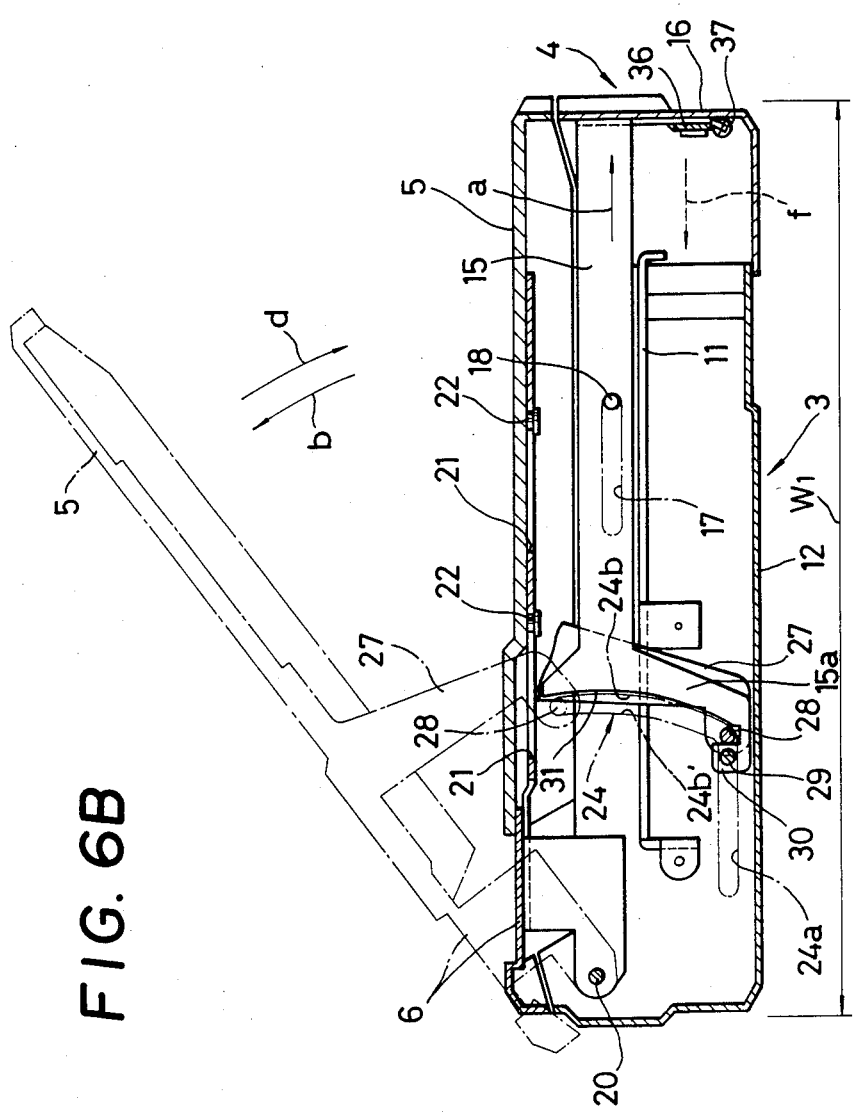
Figure 9:
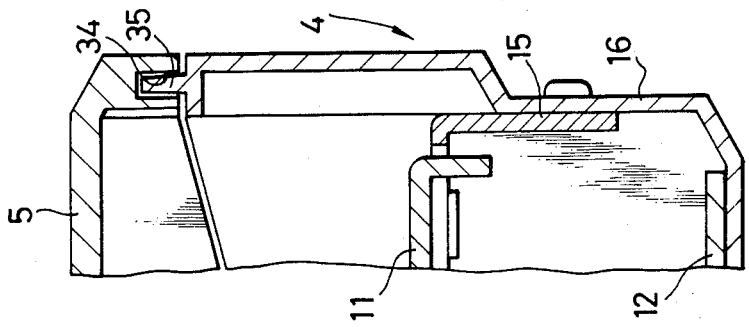
FIG. 9 is an enlarged sectional view taken along the line IX—IX on FIG. 4.

As indicated in chain-dotted lines in FIG. 1, if the secondary portion 4 of the body 2 and the cover 5 are slid together in direction of arrow a, and the widths of the body 2 and cover 5 are increased to width $W_1$, the slidable chassis 15 is also slid in direction of arrow a to the position indicated in solid lines in FIGS. 5B and 6B, and after the sliding blocks 28 and 29 slide along the linear part 24a of the guide groove 24 in direction of arrow a, the sliding block 28 enters in the curved part 24b of the guide groove 24. At this time, a plurality of engagement grooves 34 formed at the front end of the closed cover 5 are engaged respectively with a plurality of projections 35 formed at the front end of the secondary case 12 of the body 2 as shown in FIGS. 4 and 9, so that the secondary portion 4 of the body 2 and the cover 5 are slid surely together as transmit forces to each other.

The cover 5 is kept in the closed state while the sliding block 28 is slid along the linear part 24a of the guide groove 24, and released from this closed state, only when the secondary portion 4 of the body 2 reaches a position where its sliding movement is finished and that the sliding block 28 enters in the curved part 24b of the guide groove 24 as indicated in solid lines in FIGS. 5B and 6B. Further, at this time, the pawl 32 of the cover 5 is disengaged from the guide groove 33.

Next, when the unlocking button 8 is pushed in direction of arrow e as shown in FIG. 4, a sliding plate 36 integral with the unlocking button 8 is slid in direction of arrow e against the force of a spring 37, and a pawl 38 provided at the distal end of and formed integrally with the sliding plate 36 is disengaged from a pawl 39 provided at the front end of the cover 5 as indicated in chain-dotted lines in FIG. 4, so that the cover 5 is unlocked.

Hence, the cover 5 can be swung to open in direction of arrow b on the pivot 20 together with the support member 6, but the slidable chassis 15 can not be slid in direction of arrow f, because the sliding block 28 which is entered in the curved part 24b of the guide groove 24 as the cover 5 opens, is sandwiched between the curved edge 31 of the slidable chassis 15 and the curved edge 24b' of the curved part 24b of the guide groove, this curved edge 24b' being the nearer to the pivot 20 of the two side edges of the curved part 24b.

Accordingly, when the cover 5 is being opened, or is opened as indicated in chain-dotted lines in FIGS. 5B and 6B, it is absolutely impossible to slide the secondary portion 4 of the body 2 in direction of arrow f to decrease the width of the body 2 to width $W_2$ as indicated in slid lines in FIG. 1.

It may be summed up as follows:

The cover 5 is slid together with the secondary portion 4 of the body 2 under the closed state, and can be opened only when the secondary portion 4 of the body 2 is moved to the position indicated in solid lines in FIGS. 5B and 6B so that the width of the body 2 may be increased to width $W_1$.

And the width of the body 2 can not be decreased to width $W_2$ while the cover 5 is being opened, or in the opened position indicated in chain-dotted lines in FIGS. 5B and 6B, and can be slid in direction of arrow f together with the secondary portion 4 of the body 2 so as to decrease the width of the body 2 to width $W_1$ only when the cover 5 is closed as indicated in solid lines in FIGS. 5B and 6B.

Having described an illustrative embodiment of this invention with reference to the accompanying drawings, it is to be understood that the invention is not limited to that precise embodiment, and that various changes and modifications may be effected wherein by one skilled in the art without departing from the scope or spirit of the invention as defined in the appended claims. For example, the cassette tape recorder may be such that the cassette holder 7 is not used and the playback head and pinch roller are disposed on a head base plate attached slidably to the main chassis 11.

And in the emboidment, though the guide groove 24 and the curved edge 31 are disposed in the guide plate 14 and the slidable chassis 15, respectively, this guide groove 24 and curved edge 31 may be disposed in the primary case 12 and the secondary case 16, respectively. Further, the curved edge 31 may be a curved groove which is the same in shape as the curved part 24b of the guide groove 24.

In the meantime, this invention is applied not only to the casssette tape recorder for the compact cassette, used only for reproducing but also to various kinds of cassette tape recording and/or reproducing apparatus for various kinds of cassette, used for recording and/or reproducing.

What is claimed is:

1. A cassette tape recording and/or reproducing appataus comprising:
   (a) a primary portion of a body in which a tape drive mechanism is housed;
   (b) a secondary portion of said body moved slidably against said primary portion between a first position where a cassette can not be mounted and a second position where said cassette can be mounted;
   (c) cover supporting means moved swingably against said primary portion of the body;
   (d) a cover moved slidably against said cover supporting means and covering said cassette which is mounted in said primary portion and secondary portion of the body;
   (e) guide means which is disposed in said primary portion of the body and has a first guide part parallel to the sliding direction of said secondary portion and a second guide part formed almost circularly round the fulcrum of said cover supporting means as a center in succession to said first guide part;
   (f) first engagement means so disposed on said cover through a support member as to be engaged with said guide mcans and movable from said first guide part to said second guide part or in reverse as follows the movement of said cover; and
   (g) second engagement means by which said cover is slidably moved, following the movement of said secondary portion of the body,
   (h) said secondary portion of the body and said cover being so moved slidingly together by said second engagement means as to move said first engagement means along said first guide part of the guide means when said secondary portion is moved against said primary portion of the body, so that said cover is kept in its closed state, and
   (i) said first engagement means being movable along said second guide part of the guide means, only when said secondary portion of the body is in said second position, so that said cover is openable and closable with rotation of said cover supporting means.

2. A cassette tape recording and/or reproducing apparatus according to claim 1; in which an abutting means slidable with said secondary portion of the body abuts against said first engagement means when said first engagement means is in said second guide part of the guide means, so that said secondary portion can not be moved from said second position to said first position.

3. A cassette tape recording and/or reproducing apparatus according to claim 2; in which said abutting means is almost the same in configuration as said second guide part of the guide means formed circularly, and is placed on a side of said first engagement means opposite to that facing said fulcrum of the cover supporting means.

4. A cassette tape recording and/or reproducing apparatus according to claim 1 or 2, in which said second engagement means is so formed integrally with said abutting means as to be able to move said first engagement means, as said secondary portion of the body moves between said first position and second position.

* * * * *